Patented July 17, 1951

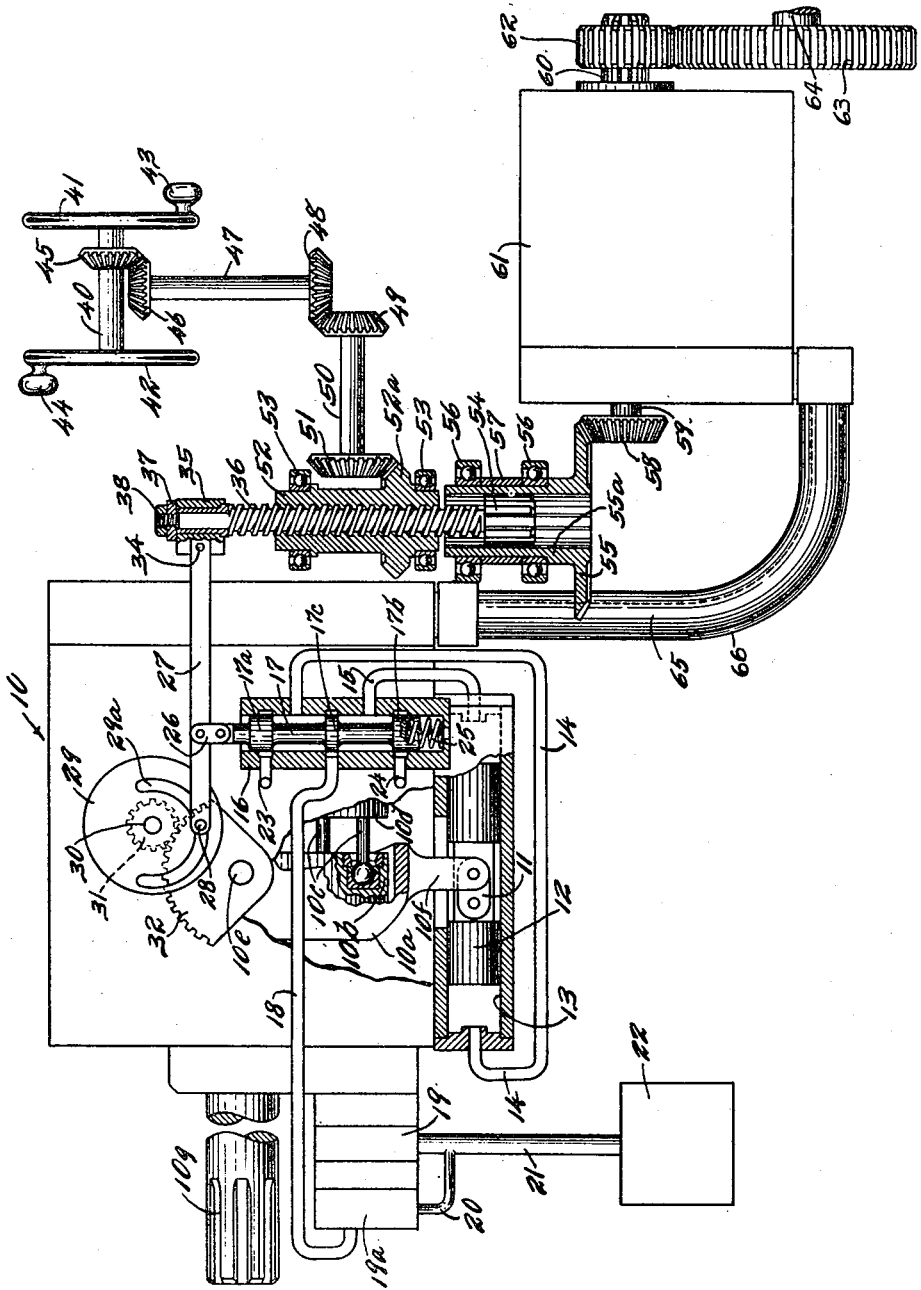

2,561,023

UNITED STATES PATENT OFFICE 2,561,023

ROTARY PUMP AND MOTOR HYDRAULIC TRANSMISSION WITH AUTOMATIC SPEED CONTROL MEANS

Garold A. Kane, Minneapolis, Minn., assignor to The Northern Pump Company, Minneapolis, Minn., a corporation of Minnesota Application August 5, 1940, Serial No. 351,474

9 Claims. (Cl. 60—53)

1

This invention relates to a control device for a hydraulic assembly or system adapted to drive a movable member through a hydraulic motor.

It is now a common practice to drive many movable members by means of hydraulic motors. Among the desirable features of driving by a hydraulic motor is one that the motor can be controlled with nicety so as to control the movements of the driven member. While the present invention has many applications, one use thereof is in driving or rotating a gun turret on a warship. Such a turret has an exceedingly large mass. It must be quickly accelerated when moved and must be decelerated under accurate control so as to be brought to a stop at the desired point. It must not overrun and must not be stopped with a shock.

It is an object of this invention to provide a simple and efficient control means for an assembly comprising a variable stroke pump and a hydraulic motor by means of which said motor and the member driven thereby may be effectively controlled so as to be accelerated and decelerated as desired.

It is a further object of the invention to provide a control system including a motor, a variable stroke pump, a valve for controlling said pump, a hand control means and connections to said valve for controlling the same from said hand control means, said motor and said pump.

It is another object of the invention to provide a control system including a motor, a variable stroke pump, a valve for controlling said pump, a manual control means, connections from said hand control means and motor to said valve and a connection from said pump to said valve for moving said valve in non-direct ratio to the change of stroke of said pump.

It is still another object of the invention to provide a hydraulic control means including a hydraulic motor and a variable stroke pump for supplying fluid thereto, a valve for controlling said pump, a hand control means connected to said valve through a differential mechanism also connected to said motor together with a control means for said valve operated from said pump.

It is rather more specifically an object of this invention to provide a hydraulic control system including a hydraulic motor, a variable stroke pump for driving the same, a valve for controlling said pump to vary the stroke thereof from neutral to full position, a hand control means connected to said valve through a differential mechanism also connected to said motor, a member moved in direct ratio to the change

2 of stroke of said pump and a connection giving non-linear movement between said valve and said member.

These and other objects and advantages of the invention will be fully set forth in the following description made in connection with the accompanying drawing in which like reference characters refer to similar parts throughout the several views and in which:

The figure is a view partly in side elevation and partly in vertical section illustrating the invention, said view being somewhat diagrammatic.

Referring to the drawing a pump 10 is shown, the same being of the variable stroke type. While any pump of the variable stroke type may be used, in the embodiment of the invention illustrated a pump of the swash plate multiple cylinder type is illustrated. Such a pump usually comprises a tilting plate 10a and the oscillating or swash plate 10b in which are fixed the ends of piston rods 10c shown as having ball and socket connections with plate 10b. The piston rods 10c will be connected to the pistons movable in cylinders in a cylinder barrel 10d. A pump of the general type referred to is illustrated in the patent to H. D. Williams and R. Janney, No. 1,062,071, May 20, 1913. The tilting plate 10a is movable about trunnions and one end of one of the trunnions is shown at 10e. Trunnion 10e therefore moves about its axis in direct ratio to the movement of the tilting plate 10a. The plate 10a is movable from neutral position in which it occupies a plane parallel with the end of the cylinder barrel or perpendicular to the axis of the cylinders to full stroke position when it occupies its maximum angle to said plane. The delivery of fluid from the pump is in proportion to the position of plate 10a. Pump 10 has a driving shaft 10g to which will be connected some suitable driving means such as an electric motor. In the embodiment of the invention illustrated plate 10a has a projecting arm 10f to which is pivotally connected one end of a short link 11 which is pivotally connected at its other end to a piston 12. Piston 12 is shown as having a reduced and flattened central portion between the cylindrical end portions thereof for accommodating arm 10f and link 11. Piston 12 is movable in a cylinder 13 having ports at both of its ends and conduits 14 and 15 are respectively connected to said ends and communicate with said ports. Conduits 14 and 15 are connected at their other ends to a cylinder 16 having spaced ports therein with which conduits 14 and 15 communicate. A piston valve 17 is fitted in and movable in cylinder 16 and has end lands 17a and 17b and a central land 17c. Liquid controlled by piston valve 17 for moving piston 12 is supplied through a conduit 18 connected to an auxiliary pump 19. Pump 19 will have a relief valve portion 19a from which a conduit 20 leads to the main exhaust conduit 21 connected to the supply or storage tank 22. Cylinder 16 is provided with discharge or exhaust ports adjacent each end with which communicate the discharge pipes 23 and 24 which will extend to a suitable storage tank. Piston valve 17 is pivotally connected at one end to a link 26 which is in turn pivotally connected at its other end to a lever 27. A coiled compression spring 25 is disposed between the lower apertured end of cylinder 16 and the lower end of land 17b of valve 17, said spring being received in a counterbore in the end of said land. Lever 27 at one end carries a stud 28 on which will be mounted a cam roller adapted to be disposed in the cam groove 29a of a cam 29. Cam 29 is mounted on a shaft 30 suitably journaled in pump 10. A pinion 31 is secured to shaft 30 and meshes with a gear segment 32 which is fixedly mounted on shaft or trunnion 10e. The other end of lever 27 is pivotally connected by pivot 34 to a head or member 35 mounted on the upper end of a screw 36, said member being held on said screw by washer 37 and nut 38. The screw 36 forms part of a differential mechanism and while various types of differential mechanisms might be used, the particular one embodying said screw is illustrated.

A hand control means is provided for operating lever 27 and while this might take various forms, in the embodiment of the invention illustrated the same comprises a shaft 40 which will be suitably supported and which has secured to its ends hand wheels 41 and 42 having handle knobs 43 and 44 respectively thereon. Shaft 40 carries a beveled gear 45 meshing with another beveled gear 46 secured to a shaft 47. Shaft 47 will be suitably supported in bearings (not shown) and has secured to its other end a beveled gear 48 which meshes with a beveled gear or pinion 49 secured to one end of a shaft 50. Shaft 50 will be suitably supported and has secured to its opposite end a beveled gear 51. The screw 36 is embraced by a nut 52 shown as of considerable length and as held from longitudinal movement in and journaled in spaced bearings 53 illustrated as of the ball bearing type. Nut 52 has secured thereto or formed thereon a beveled gear 52a with which beveled gear 51 meshes. The screw 36 extends through the nut 52 and has secured to its lower end a splined head 54. Head 54 is disposed in and splined in, so as to be longitudinally movable in, the hub 55a of a beveled gear 55. Beveled gear 55 or its hub 55a is journaled in spaced bearings 56 also shown as of the ball bearing type. A sleeve 57 is shown surrounding hub 55a between bearings 56. Gear 55 is also held from longitudinal movement in bearings 56. A beveled pinion 58 meshes with gear 55 and is connected to a shaft 59 which is connected to the driven shaft 60 of a hydraulic motor 61. Shaft 60 may have secured thereto a pinion 62 meshing with a gear 63 carried on a shaft 64. Gear 63 is therefore driven by motor 61 and can be connected to any other member which is to be driven. A conduit 65 extends from pump 10 to motor 61 through which the fluid for driving motor 61 will pass. Motor 61 will also be provided with a discharge conduit 66 extending from the motor back to the pump 10.

Assuming the pump 10 and the auxiliary pump 19 are being driven and it is desired to drive gears 62 and 63 and the member connected thereto, such as a gun turret on a warship, the operator will turn one or both of the hand wheels 41 and 42. This will turn shaft 47 and shaft 50 will be turned through gears 48 and 49, thus rotating nut 52 through gears 51 and 52a. Screw 36 will be moved as will be member 35. Lever 27 will be moved and assuming that screw 36 moves upward link 26 and valve 17 will be very slightly raised. In practice an exceedingly small movement of valve 17 is sufficient to permit enough oil to pass therethrough to operate piston 12. When valve 17 is thus moved upwardly the port communicating with conduit 18 is uncovered and fluid or oil can pass into cylinder 16 between lands 17c and 17b and through conduit 15 to the right hand end of cylinder 13. Piston 12 will be moved to the left by this fluid or oil. Any fluid in the cylinder 13 at the left hand end of piston 12 will be discharged through conduit 14 into cylinder 16 between lands 17a and 17c and will pass out through conduit 23 to a suitable storage tank. When piston 12 is moved to the left the tilting plate or box 10a is moved about its trunnion 10e, the stroke of the pump is changed from neutral and liquid is delivered by pump 10 to the motor 61. When tilting plate 10a was moved segment 32 was moved by trunnion 10e and cam 29 was rotated in a counterclockwise direction. The cam groove 29a at once acted upon the roller therein carried on stud 28 and lever 27 was again moved downwardly and valve 17 moved toward its central position. In practice valve 17 varies but slightly from central position and as stated when it is moved upwardly slightly from this position by screw 36 being operated from the hand control means cam 29 immediately depresses the left hand end of lever 27 to bring the valve back to central position. As soon as tilting plate 10a is moved the pump operates and motor 61 is driven, turning gears 62 and 63 and rotating the turret. The turret is very quickly moved and the operator will stop or retard the operation of the hand control means when the turret approaches the desired position. When motor 61 operates shaft 59 and gear 58 are rotated, thus rotating gear 55. This rotates the head 54, which as stated, is splined to gear 55 and is longitudinally movable in gear hub 55a. Head 54 thus rotates screw 36 to move the same in nut 52 in a direction opposite that in which it is moved by the rotation of nut 52 as above set forth. The movement of head 35 is thus a differential between the movements or effects of nut 52 and gear 55. If the operator ceases to operate the hand wheels 41 and 42 or if the effect of gear 55 on screw 36 is greater than the effect of nut 52 screw 36 and head 35 are moved downwardly. Motor 61 is therefore tending to move piston valve 17 to control piston 12 to change the stroke of the pump back to neutral. As soon as head 35 becomes stationary due to the rotation of gear 55 and the differential action between gear 55 and nut 52, valve 17 has been moved to central position. As the motor through gear 55 continues to move head 35, valve 17 will be moved slightly below its central position and fluid will pass from conduit 18 into cylinder 16 between lands 17c and 17a and through conduit 14 to the left hand end of piston 12. This will move piston 12 to the right and tilting plate 10a will be moved to bring the stroke of the pump back to neutral. As this occurs, motor 61 will decrease in speed and the tendency to move head 35 and the right hand end of lever 27 downwardly will decrease progressively. When tilting plate 10a is thus swung toward its neutral position segment 32 is rotated as is cam 29 and cam slot 29a raises the left hand end of lever 27 to bring valve 17 back to central position. The action continues with motor 61 tending to move head 35 downwardly and valve 17 downwardly and with cam 29 lifting the left hand end of lever 27 to lift valve 17 and bring it to central position. These movements of said parts continue until motor 61 is stopped, tilting plate 10a is in neutral position and valve 17 is in central position. As stated the movement of valve 17 is very slight. It will be noted that the connection of lever 27 to the stroke changing mechanism through cam 29 is such as to give a non-linear movement. In other words lever 27 and valve 17 are moved by cam 29 in a non-direct ratio to the change of stroke. This is an important feature. The cam can be designed to bring the valve 17 to central position more quickly than it would be so brought with a connection between lever 27 and the segment 32 giving a linear movement. The parts are thus brought to the desired position and the turret is stopped at the desired point with the deceleration at zero without the mechanism overrunning or "hunting" for the final position. To take a specific example, assuming that there was a connection between lever 27 and cam 29 giving a linear movement or a connection giving a direct or constant ratio of movement between lever 27 and cam 29 and that tilting plate 10a is in position for 10 percent of full stroke, the motor would then be running at 10 percent of full speed and lever 27 would be at 10 percent displacement. It would be necessary for the motor to make a certain number of revolutions to act sufficiently on head 35 to move lever 27 so that valve 17 would be brought to central position. With a connection giving a non-linear movement or in other words a movement varying from a linear movement and having a variable ration between the movement of lever 27 and cam 29 as disclosed and the stroke at 10 percent and the motor running at 10 percent of its full speed the cam could be designed so that it would at the same time be only 2 percent from the position causing valve 17 to take its central position. The pump thus need only make ⅕ of the number of revolutions that would be necessary with a connection giving a linear movement. The cam can be designed to give the desired action on the valve according to the gear ratio of gears 58 and 55. The number of revolutions that the motor can make from full speed to stop is usually limited in the specifications or the number of degrees that the turret shall move from full speed to stop is specified. Again if a turret to be turned by a gear 63 is to be driven at a maximum speed of 10 degrees per second, and the maximum value of acceleration is set at 10 degrees per second per second, then the shortest possible time in which the turret could be stopped from full speed is one second, assuming the acceleration were perfectly linear. The distance the turret would travel during this one second of time would then be 5 degrees. Thus, if the hand wheels are being rotated at the equivalent of top speed of the turret and then suddenly stopped, the turret would travel a minimum of 5 degrees before stopping. Therefore, at top speed a turret must lag behind the hand wheel position by 5 degrees, otherwise the turret would over travel its true corresponding position which is undesirable. If this velocity lag is linear then at half speed the velocity lag would be 2.5 degrees, and at 1/10 speed 0.5 degrees, etc. The effective gear ratio between the turret and the pump stroke adjusting means must be such that 5 degrees (or more) rotation of the turret is required to reduce the pump stroke from its maximum value to zero.

If the effective gear ratio between the turret and the pump-stroke adjusting means is maintained such that 5 degrees rotation of the turret is required to move the pump-stroke adjusting means from full stroke to zero as above stated, but the linearity is destroyed by the introduction of a suitably contoured cam, then in the above example when the hand wheels are suddenly moved the equivalent of one degree rotation of the turret, the maximum pump stroke instead of being ⅕ of a full stroke would be increased for example, to ½ of full stroke, and similarly the maximum velocity of the turret, assuming instantaneous acceleration, would be ½ of the full velocity. It is immediately apparent therefore, that with a suitably contoured cam the time required for the turret to reach its new position one degree from its original position is materially reduced and the objectionable response time lag has been appreciably diminished. While theoretically it might appear that when the hand control means is first operated the screw 36 would be elevated and the right hand end of lever 27 considerably elevated, in practice this does not take place as cam 29 immediately acts to depress the left hand end of lever 27. Lever 27 has considerable movement but it really in effect pivots about its connection to link 26.

If the hand wheels 41 and 42 were rotated to move screw 36 downwardly, the action will be exactly the same as already described except that motor 61 would be driven in the opposite direction and the turret would be turned in the opposite direction from that above described.

From the above description it will be seen that I have provided a simple and efficient control mechanism for a hydraulic system or assembly. Very accurate control can be had over the driven parts which can be quickly moved and the deceleration and stopping of the parts performed as desired. Broadly the invention contemplates a connection giving a non-linear movement or movement which varies from a linear movement between the differentially moved member 35 and the stroke changing mechanism. The structure illustrated and described is merely one embodiment of the invention. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A control device having in combination, a hydraulic motor, a variable stroke pump supplying liquid to and for driving said motor, fluid-operated means for varying the stroke of said pump, a fluid control valve for controlling said means, a lever connected intermediate its ends to said valve, a hand control means connected to one end of said lever for moving said end, said lever being also connected at said latter end to said motor to be moved by operation of said motor in a direction opposite to that in which it is moved by said hand control means, and a connection between said first mentioned means and the other end of said lever for moving said other end with a movement which varies from a linear movement whereby said valve is given a movement which varies from a linear movement.

2. The structure set forth in claim 1, said last mentioned connection comprising an oscillatable cam.

3. A control device having in combination, a hydraulic motor, a variable stroke pump for supplying liquid to and for driving said motor, fluid operated means for moving an element of said pump for changing the stroke of said pump, a valve for controlling said means, a lever for actuating said valve and connected thereto, a member connected to one end of said lever, a manually-operated means for moving said member in one direction, means driven from said motor for moving said member in the opposite direction, and a connection between said lever and element for moving the portion of said lever connected to said valve with a movement which varies from a linear movement.

4. A control device having in combination, a hydraulic motor, a variable volume delivery pump for supplying liquid to and for driving said motor, fluid-operated means for moving an element of said pump for changing the volume delivered thereby, a fluid control valve for controlling said first mentioned means, a member connected to said valve for actuating the same, a manually-operated means for moving said member, a differential mechanism connected to said manually-operated means and said member and also connected to said motor, and a cam moved by said first mentioned means and connected to said member for moving the portion of the latter connected to said valve with a movement which varies from a linear movement, whereby said valve is moved with a movement varying from a linear movement.

5. The structure set forth in claim 4, a second member moved in direct ratio to the movement of said element and means for moving said cam by said second member.

6. A control device having in combination, a hydraulic motor, a variable delivery pump for supplying liquid to and for driving said motor, fluid operated means for changing the delivery of said pump, a cylinder, a piston in said cylinder for actuating said means, a valve for controlling movement of said piston, a lever pivotally connected intermediate its ends to said valve, a member connected to one end of said lever, a manually operated means for moving said member in one direction to cause movement of said valve and means, means driven from said motor connected to said member for moving it in the opposite direction, a member moved in direct ratio to said first mentioned means and a cam driven by said last mentioned member and connected to the other end of said lever for moving the portion of said lever connected to said valve with a non-linear movement and thus move said valve with a non-linear movement.

7. A control device for a movable object having in combination, a hydraulic motor for causing movement of said object, a variable stroke pump for supplying liquid to and for driving said motor, fluid operated means for varying the stroke of said pump to vary the volume of liquid supplied to said motor, a valve for controlling said means, a hand control means, a lever, a connection between said hand control means and said lever, a second connection between said lever and valve, a third connection between said lever and said motor for moving said lever when said motor is operating, and a fourth connection between said lever and said first mentioned means for moving said lever and said second connection with a movement which varies from a linear movement, whereby said valve is moved with a movement which varies from a linear movement to bring said valve to neutral position with said object in the desired position.

8. The structure set forth in claim 7, said first mentioned connection being at one end of said lever, said last mentioned connection being at the other end of said lever and said second connection being a pivotal connection disposed intermediate the ends of said lever.

9. A control device having in combination, a fluid-operated motor, a variable volume delivery pump for supplying liquid to and for driving said motor, a fluid-operated means for varying the volume delivered by said pump, a fluid control valve for controlling said means, a member connected to said valve for moving the same, a hand control means, a differentially acting means connected to said member and also connected to said hand control means to be moved in one direction thereby, said differentially acting means also being connected to said motor and movable by operation thereof in a direction opposite to that in which it is moved by said hand control means, and a connection between said first mentioned means and said member for moving the portion of the latter connected to said valve with a movement varying from a linear movement.

GAROLD A. KANE.

REFERENCES CITED

The following references are of record in the file of this patent:

UNITED STATES PATENTS

| Number | Name | Date |
|---|---|---|
| 1,056,194 | Martineau | Mar. 18, 1913 |
| 1,108,443 | Janney | Aug. 25, 1914 |
| 1,220,424 | Janney | Mar. 27, 1917 |
| 1,296,303 | Manly | Mar. 4, 1919 |
| 1,563,282 | Jessup | Nov. 24, 1925 |
| 1,612,118 | Newlett et al. | Dec. 18, 1926 |
| 1,747,349 | Crain | Feb. 18, 1930 |
| 1,995,220 | Peck | Mar. 19, 1935 |
| 1,998,189 | Erling | Apr. 16, 1935 |
| 2,077,665 | Bennett | Apr. 20, 1937 |
| 2,203,097 | Lamond | June 4, 1940 |
| 2,213,968 | Rose | Sept. 10, 1940 |